(12) United States Patent
Rice et al.

(10) Patent No.: US 9,908,796 B2
(45) Date of Patent: Mar. 6, 2018

(54) USE OF OXIDIZING AND NON-OXIDIZING BIOCIDES FOR CONTROL OF BACTERIA TOLERANT TO STABILIZED-OXIDANT TREATMENT

(71) Applicant: NALCO COMPANY, Naperville, IL (US)

(72) Inventors: Laura E. Rice, St. Charles, IL (US); Elisa Luth, Midlothian, IL (US)

(73) Assignee: ECOLAB USA INC., St. Paul, MN (US)

( * ) Notice: Subject to any disclaimer, the term of this patent is extended or adjusted under 35 U.S.C. 154(b) by 269 days.

(21) Appl. No.: 13/657,993

(22) Filed: Oct. 23, 2012

(65) Prior Publication Data

US 2014/0110347 A1 Apr. 24, 2014

(51) Int. Cl.
C02F 1/50 (2006.01)
C02F 1/72 (2006.01)
C02F 1/00 (2006.01)
C02F 1/76 (2006.01)

(52) U.S. Cl.
CPC .............. *C02F 1/50* (2013.01); *C02F 1/008* (2013.01); *C02F 1/72* (2013.01); *C02F 1/76* (2013.01)

(58) Field of Classification Search
None
See application file for complete search history.

(56) References Cited

U.S. PATENT DOCUMENTS

| | | | |
|---|---|---|---|
| 3,681,851 A * | 8/1972 | Fleming | 34/291 |
| 3,817,828 A | 6/1974 | Bendiner et al. | |
| 3,978,235 A * | 8/1976 | Schiro | 426/335 |
| 4,297,130 A * | 10/1981 | Moore, Jr. | 504/327 |
| 4,743,561 A * | 5/1988 | Shaffar | C12Q 1/00 435/16 |
| 5,182,027 A * | 1/1993 | Gallup et al. | 210/696 |
| 5,281,537 A | 1/1994 | Robertson et al. | |
| 5,349,874 A * | 9/1994 | Schapira et al. | 73/864 |
| 5,364,439 A * | 11/1994 | Gallup et al. | 71/57 |
| 5,565,109 A | 10/1996 | Sweeny | |
| 5,622,632 A * | 4/1997 | Gallup | 210/669 |
| 5,928,875 A | 7/1999 | Breen et al. | |
| 7,306,702 B2 | 12/2007 | Pease et al. | |
| 7,341,671 B2 | 3/2008 | Shim et al. | |
| 7,773,363 B2 | 8/2010 | Pelrine et al. | |
| 7,949,432 B2 | 5/2011 | Rice | |
| 7,981,679 B2 | 7/2011 | Rice | |
| 8,012,758 B2 | 9/2011 | Enzien et al. | |
| 8,282,778 B2 | 10/2012 | Kolari et al. | |
| 8,419,899 B2 | 4/2013 | Xia et al. | |
| 8,613,837 B2 | 12/2013 | Rice et al. | |
| 2003/0029812 A1 | 2/2003 | Burns et al. | |
| 2004/0014122 A1 | 1/2004 | Breen et al. | |
| 2005/0061197 A1 | 3/2005 | Enzien et al. | |
| 2005/0079596 A1 * | 4/2005 | Hovanec | C12R 1/01 435/252.3 |
| 2005/0147528 A1 * | 7/2005 | Shim et al. | 422/37 |
| 2007/0116601 A1 * | 5/2007 | Patton | 422/81 |
| 2008/0196853 A1 * | 8/2008 | Rice | 162/181.3 |
| 2008/0199901 A1 | 8/2008 | Enzien et al. | |
| 2008/0274208 A1 * | 11/2008 | Unhoch | A61K 31/16 424/638 |
| 2009/0294082 A1 | 12/2009 | Kolari et al. | |
| 2010/0136132 A1 * | 6/2010 | van der Krieken et al. | 424/604 |
| 2010/0227332 A1 | 9/2010 | Iizumi et al. | |
| 2010/0243562 A1 * | 9/2010 | Kimura | C02F 3/10 210/605 |
| 2011/0067832 A1 | 3/2011 | Xia et al. | |
| 2013/0105389 A1 | 5/2013 | Arai et al. | |

FOREIGN PATENT DOCUMENTS

| | | |
|---|---|---|
| CA | 2524086 A1 | 4/2007 |
| JP | 2002-336867 A | 11/2002 |
| JP | 3788999 B2 | 6/2006 |
| JP | 2006217869 A | 8/2006 |
| JP | 2011-503626 A | 1/2011 |
| JP | 2012-125732 A | 7/2012 |
| KR | 1020030072079 A | 9/2003 |
| WO | WO 2004/018368 | 3/2004 |
| WO | 2004042082 A1 | 5/2004 |
| WO | WO 2009/067504 A2 | 5/2009 |
| WO | 2012101051 A1 | 8/2012 |

OTHER PUBLICATIONS

Bacterial Nitrification in Chloraminated Water Supplies, by David A. Cunliffe, Applied and Environmental Microbiology, vol. 57, No. 11, Nov. 1991, pp. 3399-3402.
Physiological Studies of Chloramine Resistance Developed by *Klebsiella pneumonia* under Low-Nutrient Growth Conditions, by Mic H. Stewart et al., Applied and Environmental Microbiology, Vo. 58, No. 9, Sep. 1992, pp. 2918-2927.
Isolation from Agricultural Soil and Characterization of a *Shingomonas* sp. Able to Mineralize the Phenyl Urea Herbicide Isoproturon, by Sebastian R. Sorensen, et al., Applied and Environmental Microbiology, Vo. 67, No. 12, Dec. 2001, pp. 5403-5409.
Primer Directed Enzymatic Amplification of DNA with a Thermostable DNA Polymerase, by Randall Saiki et al., Science, vol. 239, pp. 487-491 (1988).
Specific Synthesis of DNA in Vitro via a Polymerase-Catalyzed Chain Reaction, by Kary Mullis et al., Methods in Enzymology, vol. 155, pp. 335-350 (1987).

* cited by examiner

*Primary Examiner* — Richard C Gurtowski
(74) *Attorney, Agent, or Firm* — Eric D. Babych; Brinks Gilson & Lione

(57) ABSTRACT

The invention provides for treatment strategies that prevent or control the growth of organisms that degrade oxidant stabilizers in oxidant stabilized biocides. This allows stabilized halogen programs to perform at their intended level and prevents the need for increased halogen usage in an attempt to maintain control of these microbial populations and reduce the halogen-demand created by their enzyme byproducts.

11 Claims, No Drawings

USE OF OXIDIZING AND NON-OXIDIZING BIOCIDES FOR CONTROL OF BACTERIA TOLERANT TO STABILIZED-OXIDANT TREATMENT

CROSS-REFERENCE TO RELATED APPLICATIONS

This application is a continuation in part of U.S. patent application Ser. No. 13/374,949 filed on Jan. 24, 2012.

STATEMENT REGARDING FEDERALLY SPONSORED RESEARCH OR DEVELOPMENT

Not Applicable.

BACKGROUND OF THE INVENTION

The present invention relates generally to compositions of matter, apparatuses and methods useful in detecting, identifying, and addressing microorganisms present in commercial process systems.

The presence and growth of certain microorganism in commercial process systems is an ongoing challenge. Many of the various stages of commercial process systems contain a variety of conditions having different amounts of water, nutrients, heat, shelter, anchoring substrates, chemical conditions, and/or an absence of predators which often function as environmental niches suitable for colonization by all sorts of microorganisms. Population growth by these microorganisms often poses a number of problems including degrading process functions and fouling the end products.

One such problem is microorganism induced crust deposit formation. Crust is the accumulation on a surface of an item present in a commercial process system of a rigid solid composition comprising deposited organic and/or inorganic material. The crust can be secretions and/or colonies of microorganisms themselves. In particular crust can include or consist of the accumulation of one or more kinds of hard shelled and/or chitin bearing and/or coral organisms. Crust can have many negative impacts on systems such as decreased operational efficiency, premature equipment failure, loss in productivity, loss in product quality, and increased health-related risks. Worst of all crust must often be physically removed by scraping or other physical means and this requires expensive shut downs or disassembly of part or all of the process system.

Another problem microorganisms pose is through the formation of biofilms. Biofilms are layers of organic materials comprising microorganisms or exopolymeric substance secreted by microorganisms which aid in the formation of microbial communities. Biofilms can grow on the surfaces of process equipment as well as in pools of fluid. These biofilms are complex ecosystems that establish a means for concentrating nutrients and offer protection for growth. Biofilms can accelerate crust, corrosion, and other fouling processes. Not only do biofilms contribute to reduction of system efficiencies, but they also provide an excellent environment for microbial proliferation of other microorganisms including pathogenic organisms. It is therefore important that biofilms and other fouling processes be reduced to the greatest extent possible to maximize process efficiency and minimize the health-related risks from such pathogens.

Several factors contribute to the extent of biological contamination and govern the appropriate response. Water temperature; water pH; organic and inorganic nutrients; growth conditions such as aerobic or anaerobic conditions, and in some cases the presence or absence of sunlight, etc. can play an important role. These factors also help in deciding what types of microorganisms might be present in the water system and how best to control those microorganisms. Proper identification of the microorganism is also crucial to responding appropriately. Differences regarding whether the microorganisms are plants, animals, or fungi, or if they are planktonic or sessile determines how effective various biocontrol strategies will be. Because different microorganisms induce different problems, proper identification is crucial to properly remediating unwanted microbial effects. Finally because chemically caused problems cannot be remediated with biocides, it is also necessary to identify which problems have non-biologically based origins.

One category of matter commonly used to respond to micro-organism infestations is oxidants. Oxidants, such as sodium hypochlorite, are highly reactive and effectively "burn" away the cell walls of many microorganisms. Unfortunately because they are so reactive such oxidants often either lose effectiveness very quickly or they corrode or otherwise interact harmfully with other components or materials used in commercial process systems.

As a result, a number of technologies have been developed to stabilize oxidants. Some methods are described in U.S. Pat. Nos. 5,565,109 and 7,776,363. Such stabilization results in a countering of the so called oxidant demand effect. In an oxidant demand effect reaction, because the oxidant is in the presence of something that it is highly reactive with, the oxidant tends to rapidly react and become unavailable for use as a biocide. By stabilizing oxidants, the oxidant remains present in the system for a longer period of time and is capable of suppressing microorganisms for an extended period of time.

In the biological world, however the demise of one organism often means a niche becomes available for another organism (which was previously suppressed by its now dead neighbors) to colonize. This in fact is often the case in process water treated with stabilized oxidant biocides. Many organisms (such as for example *Sphingomonas* sp., *Acinetobacter*, and *Flavobacterium*) secrete chemicals which can destroy the oxidant stabilizers and once their former competitors are killed off by the stabilized oxidants, they are capable of colonizing those environments despite the presence of the stabilized oxidants. As a result methods and apparatuses are needed to follow up after treating a commercial process system with a stabilized oxidant biocide to ensure these organisms have been eradicated.

Thus it is clear that there is clear utility in novel methods and compositions for the follow up to stabilized oxidant biocide treatment of a commercial process system. The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

At least one embodiment of the invention is directed towards a method of addressing a microorganism infestation in a process water system. The method comprises the steps of: introducing a biocidal composition comprising an oxidant and an oxidant stabilizer into the process water system, the stabilizer allowing the oxidant to persist as a biocide despite the high demand for the oxidant in the system, detecting the presence of an organism capable of degrading the oxidant stabilizer, and if so detected, introducing a composition of matter capable of neutralizing the degrading organism without otherwise impairing the effectiveness of the biocidal composition.

The stabilizer may comprise a nitrogen-based compound. The organism may be a urease secreting organism and/or a nitrifying organism. The composition may be susceptible to high demand. The organism may remain neutralized long after the composition susceptible to high demand has been completely consumed. The detection may be accomplished by at least one item selected from the list consisting of DNA analysis, PCR analysis, qPCR analysis, urease detection, ammonia detection, ammonia monooxygenase detection, nitrite oxidoreductase, nitrate detection, nitrite detection, hydroxylamine detection, and any combination thereof. But for the introduction of the neutralizing composition, the organism may actually better thrive in the presence of the biocidal composition than in its absence because it feeds on the stabilizer or a derivative thereof. The neutralizing composition may comprise Glutaraldehyde, DBNPA, sodium hypochlorite, inorganic chloramine, and any combination thereof. The neutralizing composition may comprise inorganic chloramine if a urease-degrading population is detected.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Adaptor" means an organism that exhibits some level of tolerance to the biocontrol program. When the adaptor's microbial competition is reduced by a biocide, this adaptive organism is able to flourish and may form a biofilm.

"Biological" means a composition of matter in which at least 10% of the composition (by volume or mass) comprises cells from an organism.

"High Demand" or "High oxidant demand" means the presence of a chemical that is highly reactive with oxidants in a particular environment and the oxidant will therefore rapidly react and will not persist for any appreciable extent after a short period of time. High demand conditions deplete unstabilized oxidants more rapidly than stabilized oxidants.

"Opportunist" means an organism that thrives by settling into pre-established biofilms, crusts, deposits, or other colonies of organisms, and tends to supplant, displace, or coexist alongside pioneer organisms and/or previous opportunist organisms.

"PCR Analysis" means polymerase chain reaction analysis.

"Probe" means a composition of matter constructed and arranged to bind to a targeted section of DNA and which can be readily detected when so bound and thereby be used to indicate the presence or absence of the targeted section of DNA.

"qPCR Analysis" means quantitative polymerase chain reaction analysis.

"Microorganisms" mean any organism small enough to insinuate itself within, adjacent to, on top of, or attached to equipment used in an industrial process (including papermaking), it includes but is not limited to those organisms so small that they cannot be seen without the aid of a microscope, collections or colonies of such small organisms that can be seen by the naked eye but which comprise a number of individual organisms that are too small to be seen by the naked eye, as well as one or more organisms that can be seen by the naked eye, it includes but is not limited to any organism whose presence, in some way impairs the industrial process such as forming plugs in nozzles and/or within felts and/or causing defects within paper sheets.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

Oxidants (such as sodium hypochlorite) are routinely applied to industrial process systems (such as paper systems) to control microbial growth and deposit formation. In many instances they include a halogen (such as chlorine) which is often consumed due the presence of high demand compositions (e.g. sulfite) in many environments and is therefore often stabilized with stabilizing compounds (such as nitrogenous compounds) to enhance persistence of the halogen residual in water systems with high halogen-demand and to improve compatibility with process additives (e.g. optical brightening agents, dyes, strength aids, and sizing agents) relative to free or unstabilized-chlorine.

As described in U.S. Pat. No. 7,773,363, one composition used to stabilize oxidants such as chlorine is urea. Unfortunately, in some situations it has been observed that applications of urea-stabilized chlorine programs over time resulted in the high persistence of certain bacteria and fungi. This persistence may occur despite increased treatment levels. This is consistent with a failure of the oxidant stabilizer to continue to effectively stabilize the oxidant leading to more rapid consumption of the oxidant and less effective control of microbial growth. Closer observation indicated that the bacteria were secreting chemicals (such as enzymes) which degraded the stabilizer and resulted in the loss of halogen due to halogen demand and increased tolerance of the organisms to oxidant treatment.

In at least one embodiment after implementing a stabilized oxidant biocide regimen, a post treatment strategy is implemented to address the rise of organisms that degrade the oxidant stabilizer. In at least one embodiment the strategy provides for preventing or controlling the growth of urea-degrading organisms. This allows urea-stabilized chlorine programs to perform at their intended level and prevents the need for increased chlorine usage in an attempt to maintain control of these microbial populations and reduce the chlorine-demand created by their enzyme byproducts.

In at least one embodiment the post treatment strategy involves the use of compositions of matter which do not react with the stabilized oxidant or oxidant stabilizer and which also are effective at killing the stabilizer-degrading organisms. In at least one embodiment the composition of matter is a non-oxidizing biocide such as but not limited to dibromonitrilopropionamide (DBNPA) (for example as found in product Nalcon 7649, sold by Nalco Company, Naperville, Ill.) and glutaraldehyde (for example as found in product Nalcon 7634 sold by Nalco Company, Naperville, Ill.). In at least one embodiment sodium hypochlorite or inorganic chloramine programs generated by blending sodium hypochlorite with ammonium salts (e.g. ammonium sulfate or ammonium bromide) are also effective for the control of a stabilizer degrading organisms such as those that that exhibit tolerance to urea-stabilized chlorine programs.

In at least one embodiment the method involves the step of anticipating the rise of a stabilizer degrading organisms before it degrades the stabilizer (or at least before it does so to a detectable or significant degree) and neutralizing the organism before the unwanted degradation occurs. For example any one of the methods, compositions, and apparatuses for detecting a diversity index described in U.S. patent application Ser. No. 13/550,748 could be used to anticipate the rise of stabilizer degrading organisms. As a result the post treatment strategy could involve determining if a stabilizer degrading organism would arise and after it has been so determined but before the organisms has actually significantly degraded the stabilizer would biocides targeting that organisms be applied.

In at least one embodiment the composition added to kill the stabilizer-degrading organisms is a composition susceptible to high demand. Compositions which are susceptible to high demand within a given environment, by definition will not persist long in that environment. As a result, it would not be expected that their application could impart long term anti-microbial benefits. However when applied as a post treatment to a stabilized biocide, the secondary oxidant, which is susceptible to high demand kills off opportunistic adaptor organisms which degrade the stabilizer, and with the stabilizer no longer degraded, the stabilized oxidant continues to maintain the process system in an acceptable antimicrobial state. In at least one embodiment the post treatment of a secondary oxidant maintains the absence of stabilized oxidant resistant organisms long after the composition susceptible to high demand is completely consumed by reaction or diluted from the process system. In at least one embodiment the composition susceptible to high demand is sodium hypochlorite or inorganic monochloramine.

In at least one embodiment the stabilizer degrading organism is an organism capable of degrading urea or is a nitrifying organism. As described for example in scientific papers: *Bacterial Nitrification in Chloraminated Water Supplies*, by David A. Cunliffe, *Applied And Environmental Microbiology*, Vol. 57, No. 11, November 1991, pp. 3399-3402, *Physiological Studies of Chloramine Resistance Developed by Klebsiella pneumonia under Low-Nutrient Growth Conditions*, by Mic H. Stewart et al., *Applied And Environmental Microbiology*, Vol. 58, No. 9, September 1992, pp. 2918-2927, and *Isolation from Agricultural Soil and Characterization of a Shingomonas sp. Able to Mineralize the Phenyl Urea Herbicide Isoproturon*, by Sebastian R. Sørensen, et al., *Applied And Environmental Microbiology*, Vol. 67, No. 12, December 2001, pp. 5403-5409, nitrifying and urea-degrading organisms derive energy by oxidizing nitrogen containing compounds (such as ammonia or urea) into ammonia, nitrites, or nitrates. As a result these organisms not only degrade nitrogen based stabilizers but may actually better thrive in the presence of a nitrogen based stabilizer biocide than in its absence. Furthermore, nitrite accelerates the decay of inorganic chloramine residuals.

In at least one embodiment the post treatment includes the step of detecting the presence of a urea-degrading organism and applying a response to neutralize the urea-dedgrading organism without otherwise harming the stabilized oxidant composition. In at least one embodiment the detection is achieved through DNA based analysis involving the use of PCR primers to detect the presence and/or absence and quantity of urea-dedgrading organisms. U.S. Pat. No. 5,928,875 describes the use of PCR primers to detect the presence or absence of spore forming bacteria. In at least one embodiment the primer is targeted towards a part of a DNA strand which is highly conserved among urea-dedgrading organisms. In at least one embodiment the PCR analysis involves utilizing one or more of the methods described in the Article *Primer Directed Enzymatic Amplification of DNA with a Thermostable DNA Polymerase*, by Randall Saiki et al., *Science*, Volume 239, pp. 487-491 (1988). In at least one embodiment the PCR analysis involves utilizing one or more of the methods described in the Article *Specific Synthesis of DNA in Vitro via a Polymerase-Catalyzed Chain Reaction*, by Kary Mullis et al., *Methods In Enzymology*, Volume 155, pp. 335-350 (1987).

In at least one embodiment the post treatment includes the step of detecting the presence of a nitrifying organism and applying a response to neutralize the nitrifying organism without otherwise harming the stabilized oxidant composition. In at least one embodiment the detection is achieved through DNA based analysis involving the use of PCR primers to detect the presence and/or absence and quantity of nitrifying organisms. U.S. Pat. No. 5,928,875 describes the use of PCR primers to detect the presence or absence of spore forming bacteria. In at least one embodiment the primer is targeted towards a part of a DNA strand which is highly conserved among nitrifying organisms. In at least one embodiment the PCR analysis involves utilizing one or more of the methods described in the Article *Primer Directed Enzymatic Amplification of DNA with a Thermostable DNA Polymerase*, by Randall Saiki et al., *Science*, Volume 239, pp. 487-491 (1988). In at least one embodiment the PCR analysis involves utilizing one or more of the methods described in the Article *Specific Synthesis of DNA in Vitro via a Polymerase-Catalyzed Chain Reaction*, by Kary Mullis et al., *Methods In Enzymology*, Volume 155, pp. 335-350 (1987).

In at least one embodiment the PCR analysis is a qPCR analysis as described in Trade Brochure *qPCR guide*, prefaced by Jo Vandesompele, (as downloaded from website http://www.eurogentec.com/file-browser.html on Jan. 19, 2012). In at least one embodiment the method is a quantitative qPCR analysis. In at least one embodiment the method is a qualitative qPCR analysis.

In at least one embodiment, the polymerase chain reaction (PCR) is a method for targeting sequences of nucleic acid (DNA or RNA) and increasing the copy number of the target sequence to obtain useful quantities of nucleic acid for down-stream analysis. This method can be applied to the detection of urea-degrading and nitrifying organisms in a variety of samples that include, but are not limited to, machine felts, sheet defects, machine deposits, etc.

In at least one embodiment, once DNA is extracted from the sample, using any of the DNA extraction kits available commercially, it can be analyzed in real-time using a PCR approach such as a Quantitative PCR approach. Quantitative PCR utilizes the same methodology as PCR, but it includes a real-time quantitative component. In this technique, primers are used to target a DNA sequence of interest based on the identity of the organism or function of a specific gene. Some form of detection such as fluorescence may be used to detect the resulting DNA or 'DNA amplicon'. The change in fluorescence is directly proportional to the quantity of target DNA. The number of cycles required to reach the predetermined fluorescence threshold is compared to a standard that corresponds to the specific DNA target. A standard is typically the target gene that is pure and of known quantity at concentrations that span several logs. The number of copies of target DNA present in the sample is calculated using the standard curve. The copy number per sample is then used to determine the number of cells per sample.

In at least one embodiment a primer set is used which targets DNA sequences from nitrifying organisms using a conservative approach to quantify total organisms. In at least one embodiment a primer set is used which targets urea-degrading organisms, including, but not limited to, *Sphingomonas* sp., *Sphingomonas* spp., *Acinetobacter*, and *Flavobacterium*. In at least one embodiment the primer is used to distinguish between urea-degrading and non-urea-degrading organisms.

In at least one embodiment a primer set is used which targets DNA sequences from nitrifying organisms using a conservative approach to quantify total organisms. In at least one embodiment a primer set is used which targets nitrifying organisms, including, but not limited to, *Nitrosomonas*, *Nitrosolobus*, *Nitrosococcus*, *Nitrosovibrio*, *Niotrosospira*, *Nitrobacter*, and *Nitrococcus*. In at least one embodiment the primer is used to distinguish between nitrifying and non-nitrifying organisms.

The process water stream of a paper mill was treated using a urea-stabilized chlorine program. While initial laboratory screening prior to the application of stabilized-oxidant program indicated that urea-stabilized chlorine programs were effective in controlling microbial growth in this mill, repeat screening indicated that this program was no longer effective (Table 1). This bacterial population also exhibited tolerance to isothiazolone biocides.

Table 1 show that a Laboratory screening on process water treated with NaOCl was compared to screening results on a sample of process water after 10-months of treatment with urea-stabilized chlorine. Results indicate the development of a microbial population tolerant to process water treatment with a urea-stabilized chlorine program. Process water samples were challenged with untreated process water (1% v/v) after the 4-hours samples were plated. Typically, urea-stabilized chlorine exhibits excellent long-term preservation with low bacterial densities at 4- and 24-hours relative to an untreated control. In Table 1, preservation from urea-stabilized chlorine was observed prior to the application of this program to the mill water system and development of the tolerant population. Repeat screening demonstrated the tolerance of the new mill population to the urea-stabilized chlorine program.

TABLE 1

| Treatment | CFU/mL | | | | | |
|---|---|---|---|---|---|---|
| | Initial Screening | | | Repeat Screening | | |
| (5 ppm Cl2) | 1-hour | 4-hour | 24-hour | 1-hour | 4-hour | 24-hour |
| NaOCl | $3.4 \times 10^5$ | $3.6 \times 10^6$ | $1.9 \times 10^7$ | $2.8 \times 10^6$ | $6.0 \times 10^6$ | $3.6 \times 10^7$ |
| Cl2-urea | $5.3 \times 10^3$ | <100 | <100 | $2.0 \times 10^6$ | $1.1 \times 10^7$ | $2.8 \times 10^7$ |

In at least one embodiment the detection method involves detecting the telltale presence of a stabilizer degrading organism. For example because many of these organisms secret urease so the method involves detecting the presence of urease or ammonia. Also many nitrifying organisms convert the stabilizer into end reactants that would otherwise not result from the oxidation reaction of the biocide so the method involves detecting the presence of these end reactants (such as the specific nitrates, hydroxylamine, or nitrites produced by their digestion of nitrogenous compounds). In addition the strategy could involve detecting other non-nitrogen based end reactants that these organisms produce (e.g. ammonia monooxygenase or nitrite oxidoreductase). Finally another strategy could involve noting that if when using a diversity index analysis, if the overall population grows in response to applying a stabilized oxidant biocide, but it briefly declines in response to applying a non-stabilized version of that biocide, it suggests the colonization of the system by organisms feeding on the stabilizer. Another strategy could involve noting the development of the population by screening the antimicrobial effect of the stabilized oxidant in a laboratory.

EXAMPLES

The foregoing may be better understood by reference to the following examples, which are presented for purposes of illustration and are not intended to limit the scope of the invention.

Several bacteria surviving C12/60615 treatment exhibited yellow or orange pigmentation when samples were plated on non-selective agar media. These organisms were isolated into pure culture and were identified as *Sphingomonas* species based on DNA sequencing. These isolates exhibited the ability to produce urease. Urease enzyme breaks down urea into ammonia, which can then provide a nutrient source for other bacteria. Furthermore, urease has been determined to serve as a significant source of chlorine-demand and also exhibits some interaction with urea-stabilized chlorine based on higher ammonia levels after urea-stabilized chlorine is exposed to the urease enzyme (Tables 2 and 3). This indicates the degradation of urea, which likely impacts the performance of urea-stabilized chlorine programs.

TABLE 2

Urease enzyme leads to a reduction in chlorine residuals, indicating that this enzyme serves as a significant source of chlorine demand.

| | TRO (as ppm Cl2) | | |
|---|---|---|---|
| Treatment | 1-hour | 4-hour | 24-hour |
| NaOCl Control | 4.6 | 4.5 | 4.1 |
| NaOCl + Urease (10 units/mL) | 1.2 | 0.8 | 0.5 |

TABLE 3

Exposure of urea-stabilized chlorine to urease led to an increase in ammonia concentrations (NH3—N). This indicates the degradation of urea, which likely impacts the performance of urea-stabilized chlorine programs.

| Treatment | NH3—N (ppm) | |
|---|---|---|
| | 1-hour | 24-hour |
| Cl2-urea (5ppm Cl2) | 0.379 | 0.344 |
| Cl2-urea (5ppm Cl2) + Urease (10 units/mL) | 0.735 | 0.803 |

This problem of increased chlorine-demand and the development of a tolerant population appeared to be specific to applications using urea-stabilized chlorine and has not been observed in applications using dimethyl hydantoin-stabilized chlorine programs or inorganic chloramine programs generated by blending sodium hypochlorite with ammonium salts. Systems treated with inorganic chloramine are more likely to develop tolerance issues related to the development of nitrifying populations of bacteria.

Antimicrobial screening of non-oxidizing biocides indicated that dibromonitrilopropionamide and glutaraldehyde provided effective control of urease-producing microorganisms and are compatible with urea-stabilized chlorine. Sodium hypochlorite or inorganic chloramine programs generated by blending sodium hypochlorite with ammonium salts (e.g. ammonium sulfate or ammonium bromide) are also effective for the control of urease-producing bacteria that exhibited tolerance to urea-stabilized chlorine programs (Tables 4, 5 and 6).

TABLE 4

Glutaraldehyde, Dibromonitrilopropionamide, and NaOCl are particularly effective at controlling Cl2-urea tolerant bacteria at typical use rates.

| Treatment (ppm product or Cl2) | CFU/mL 24-hour |
|---|---|
| Control | 6.3 × 10⁵ |
| Glutaraldehyde (50% a.i.) | |
| 25 | 100 |
| 100 | <100 |
| Dibromonitrilopropionamide (20% a.i.) | |
| 25 | 4.2 × 10³ |
| 100 | <100 |
| Isothiazolone (4% a.i.) | |
| 25 | 1.4 × 10⁴ |
| 100 | 1.5 × 10³ |
| Bronopol (10% a.i.) | |
| 25 | 1.0 × 10⁵ |
| 100 | 1.3 × 10⁴ |
| NaOCl (ppm as Cl2) | |
| 2.5 | 5.1 × 10⁵ |
| 10.0 | <100 |
| Cl2-urea (ppm as Cl2) | |
| 2.5 | 4.5 × 10⁵ |
| 10.0 | 4.0 × 10⁴ |

Table 5 illustrates laboratory screening was conducted using process water treated with urea-stabilized chlorine. Process water samples were challenged with untreated process water (1% v/v) after the 4-hour samples were plated. Results indicate the development of a microbial population tolerant to treatment with a urea-stabilized chlorine program, as this program had little effect in reducing bacterial density relative to an untreated control. Glutaraldehyde, Dibromonitrilopropionamide, and inorganic chloramine prepared by blending NaOCl and ammonium sulfate were particularly effective at controlling Cl2-urea tolerant bacteria at typical use rates. NaOCl was also effective, but was required at higher concentrations, which could lead to incompatibility with other additives used in the papermaking process. Glutaraldehyde and dibromonitrilopropionamide were compatible with Cl2-urea. Isothiazolone and bronopol were not effective at controlling the tolerant population.

TABLE 5

| Treatment (ppm product or Cl2) | CFU/mL | | |
|---|---|---|---|
| | 1-hour | 4-hour | 24-hour |
| Control | 1.6 × 10⁷ | 1.1 × 10⁷ | 9.0 × 10⁶ |
| Glutaraldehyde (50% a.i.) | | | |
| 25 | 1.0 × 10⁶ | 8.5 × 10³ | 1.0 × 10² |
| 100 | 1.0 × 10² | 1.0 × 10² | 2 × 10² |
| Dibromonitrilopropionamide (20% a.i.) | | | |
| 25 | 1.4 × 10⁵ | 7.0 × 10⁴ | 3.0 × 10⁴ |
| 100 | 6.0 × 10² | 2.0 × 10² | 3.0 × 10² |
| NaOCl (ppm as Cl2) | | | |
| 2.5 | 1.9 × 10⁵ | 2.0 × 10⁶ | 1.0 × 10⁷ |
| 10.0 | 2.0 × 10² | 2.0 × 10² | 5.0 × 10² |
| Cl2-urea (ppm as Cl2) | | | |
| 2.5 | 1.1 × 10⁷ | 4.3 × 10⁷ | 6.0 × 10⁶ |
| 10.0 | 1.6 × 10⁷ | 1.9 × 10⁷ | 1.8 × 10⁷ |
| Cl2-ammonium sulfate (ppm as Cl2) | | | |
| Cl2-urea (2.5 ppm) + glut (25 ppm) | 4.0 × 10² | 1.0 × 10² | 7.6 × 10³ |
| | 1.0 × 10² | 4.0 × 10² | 2.0 × 10² |
| | 5.0 × 10⁶ | 4.0 × 10² | 1.0 × 10² |
| Cl2-urea (2.5 ppm) + DBNPA (25 ppm) | 1.5 × 10⁵ | 4.0 × 10² | 2.0 × 10³ |

The result of these examples demonstrates that stabilized oxidant biocide treatments may cease to be effective if there are stabilizer degrading organisms present in the system and in order to re-establish the effectiveness of the stabilized oxidant biocide treatment the degrading organisms must be neutralized in a manner that does not otherwise impair or degrade the stabilized oxidant biocide or any other material or item also present in the process water system.

While this invention may be embodied in many different forms, there described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and/or incorporated herein. In addition the invention encompasses any possible combination that also specifically excludes any one or some of the various embodiments described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of controlling a microorganism infestation in a process water system, the method comprising:
   introducing a biocidal composition comprising an oxidant and an oxidant stabilizer into the process water system, the oxidant stabilizer allowing the oxidant to persist as a biocide despite a high demand for the oxidant in the process water system,
   analyzing the process water system for nitrifying organisms capable of degrading the oxidant stabilizer; and
   introduction a neutralizing composition into the process water system when the nitrifying organisms become resistant to the oxidant and the oxidant stabilizer.

2. The method of claim 1, wherein the oxidant stabilizer comprises a nitrogen-based compound.

3. The method of claim 1, wherein the nitrifying organism is selected from the group consisting of *Nitrosomonas, Nitrosolobus, Nitrosococcus, Nitrosovibrio, Niotrosospira, Nitrobactre, Nitrococcus*, and any combination thereof.

4. The method according to claim 1, wherein the analyzing step comprises a step selected from the group consisting of DNA analysis, PCR analysis, qPCR analysis, urease detection, ammonia detection, ammonia monooxygenase detection, nitrite oxidoreductase, nitrate detection, nitrite detection, hydroxylamine detection, and any combination thereof.

5. The method according to claim 1, in which the neutralizing composition comprises Glutaraldehyde, DBNPA, and any combination thereof.

6. The method according to claim 1, in which the neutralizing composition comprises sodium hypochlorite.

7. The method according to claim 1, in which the analyzing step comprises detecting stabilizer by products formed in the process water system by nitrifying organisms.

8. A method for controlling bacterial growth in a process water system, the method comprising:
   introducing a biocidal composition into the process water system, wherein the biocidal composition comprises an oxidant and an oxidant stabilizer, and wherein the oxidant is introduced to control the growth of bacteria in the process water system;
   analyzing the process water system for nitrifying organisms; and
   introducing a neutralizing composition into the process water system when the nitrifying organisms become resistant to the oxidant and the oxidant stabilizer, wherein the neutralizing composition kills or limits growth of the nitrifying organisms in the process water system, and wherein the neutralizing composition comprises dibromonitrilopropionamide.

9. The method according to claim 8, wherein the nitrifying organisms degrade the oxidant stabilizer.

10. The method according to claim 8, wherein analyzing for growth of nitrifying organisms comprises a step selected from the group consisting of DNA analysis, PCR analysis, qPCR analysis, ammonia monooxygenase detection, nitrite oxidoreductase, nitrate detection, nitrite detection, hydroxylamine detection, and any combination thereof.

11. The method according to claim 8, wherein the nitrifying organism is selected from the group consisting of *Nitrosolobus, Nitrosococcus, Nitrosovibrio, Niotrosospira, Nitrococcus*, and any combination thereof.

* * * * *

UNITED STATES PATENT AND TRADEMARK OFFICE
CERTIFICATE OF CORRECTION

PATENT NO. : 9,908,796 B2
APPLICATION NO. : 13/657993
DATED : March 6, 2018
INVENTOR(S) : Laura E. Rice et al.

Page 1 of 1

It is certified that error appears in the above-identified patent and that said Letters Patent is hereby corrected as shown below:

In the Claims

Column 11, Claim 1, Line 29, delete "introduction" and insert -- introducing --, therefor.

Column 11, Claim 2, Line 32, delete "of" and insert -- according to --, therefor.

Column 11, Claim 3, Line 34, delete "of" and insert -- according to --, therefor.

Column 11, Claim 3, Line 36, delete "Niotrosospira," and insert -- Nitrosospira, --, therefor.

Column 11, Claim 3, Line 37, delete "Nitrobactre," and insert -- Nitrobacter, --, therefor.

Column 12, Claim 5, Line 4, delete "in which" and insert -- wherein --, therefor.

Column 12, Claim 6, Line 7, delete "in which" and insert -- wherein --, therefor.

Column 12, Claim 7, Line 9, delete "in which" and insert -- wherein --, therefor.

Column 12, Claim 7, Line 10, delete "by products" and insert -- byproducts --, therefor.

Column 12, Claim 11, Line 38, delete "Niotrosospira," and insert -- Nitrosospira, --, therefor.

Signed and Sealed this
Sixteenth Day of April, 2019

Andrei Iancu
*Director of the United States Patent and Trademark Office*